Dec. 14, 1965     R. F. ROBBINS     3,223,189
WEIGH SCALE FOR FISH LANDING NETS
Filed Feb. 20, 1964
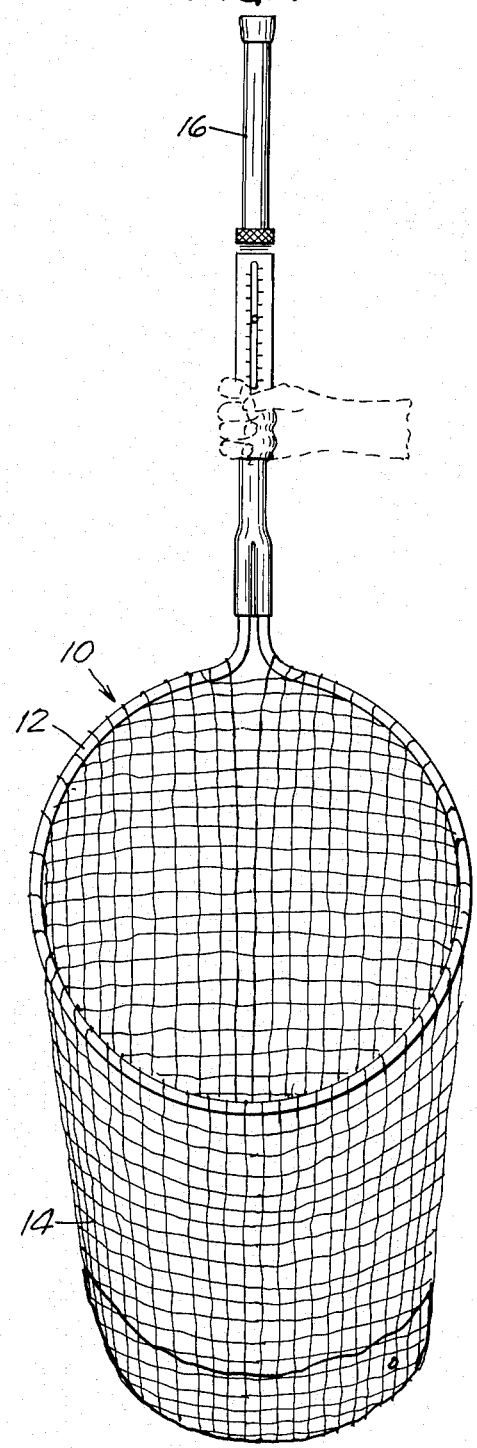
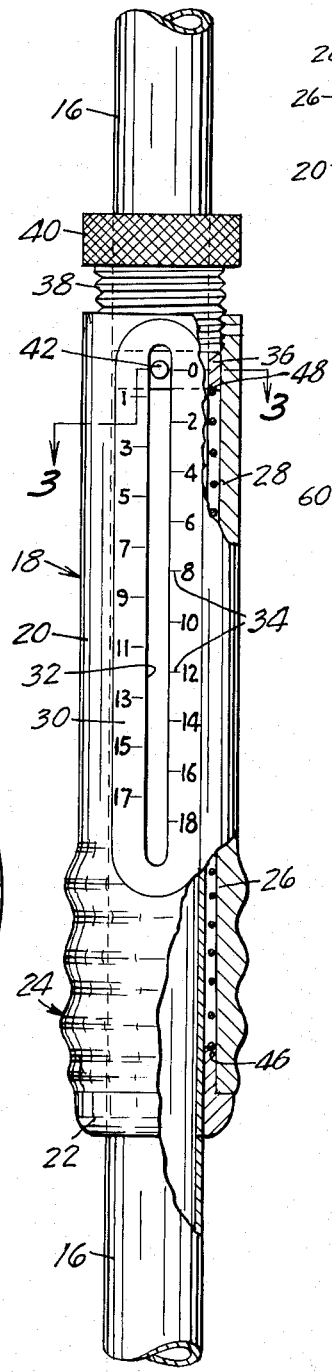
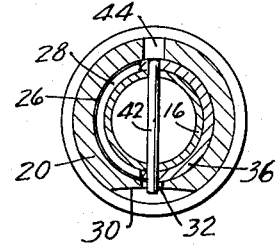
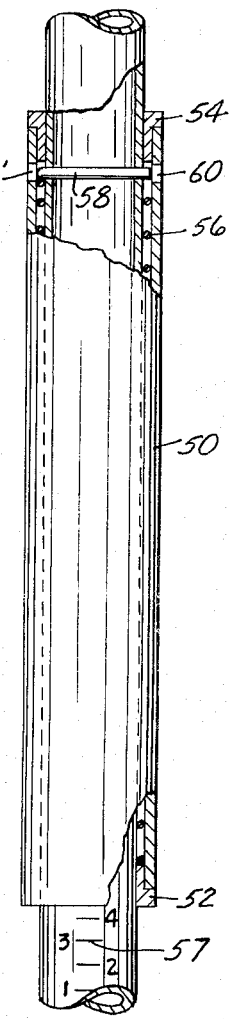
INVENTOR
ROY F. ROBBINS
BY
Stanley G. DeFallint
ATTORNEY

United States Patent Office 3,223,189
Patented Dec. 14, 1965

3,223,189
WEIGH SCALE FOR FISH LANDING NETS
Roy F. Robbins, St. Paul, Minn., assignor to Louis G. Ernster, doing business as Ernco Enterprises, South St. Paul, Minn.
Filed Feb. 20, 1964, Ser. No. 346,286
5 Claims. (Cl. 177—149)

The present invention relates to a novel weigh scale for use in combination with a fish landing net. More particularly, my invention concerns a novel weigh scale unit journalled about, but readily removable from the handle of a fish landing net, whereby a fish in the net is automatically weighed simply by grasping said scale device and turning the handle vertically.

A specific preferred embodiment of my invention provides a scale device which is adapted to be operably affixed to the handle of a conventional landing net simply, quickly, and easily, even though such net was not originally manufactured or intended to be so used.

In describing my invention, I am aware that others have concerned themselves with the general idea of a weigh scale for a fish landing net. For example, see Fowle Patent No. 2,633,351, granted March 31, 1953, and Hedges Patent No. 2,129,469, granted September 6, 1938. Others have described combination gaff hooks and weigh scales: see Rominski Patent No. 2,446,720, granted August 10, 1948, and McRae Patent No. 2,586,245, granted February 19, 1952.

However, none of these prior patents describes, nor has anyone heretofore provided, insofar as I am aware, a combination device having the advantages and utility provided by the structure of my invention. Many of such advantages will become apparent from the following description of illustrative embodiments of my invention, taken in conjunction with the accompanying drawing, in which:

FIGURE 1 is a view of a fish landing net with the scale device attached thereto, the net being in a position for weighing a fish therein.

FIGURE 2 is an enlarged view, partially cut away, of a portion of the handle and the scale unit or device shown in FIGURE 1.

FIGURE 3 is a section view taken along the lines 3—3 of FIGURE 2.

FIGURE 4 is a view of a portion of a handle of a fish landing net and a modified scale unit or device of the present invention.

Referring now to FIGURES 1–3, the fish landing net 10 comprises a generally circular frame 12, the open end of the net 14 being secured to the frame by cords of the net which are looped thereover. The two ends of the circular frame 14 are brought together in parallel relation and are received in and fastened to one end of elongate tubular handle 16, such as by press fitting, rivetting, etc.

My weight scale unit 18 is journalled on and about said handle 16 and positioned approximately midway of the length of the latter.

Referring more specifically to FIGURES 2 and 3, the scale unit is seen to comprise an elongated cylinder 20 concentrically disposed about the handle, the inside diameter of the cylinder being somewhat larger than the diameter of handle 16. At the lower end of the cylinder 20 is a bearing cap 22, which is fastened, e.g., press-fit, into the cylinder, the inside diameter of the bearing cap being just slightly larger than the diameter of said handle 16 so as to permit said handle easily to slide in the axial direction with respect thereto. Toward its lower end the outer surface of the cylinder 20 can be shaped into transverse knobs and grooves so as to provide a comfortable grip 24 for the fingers of the human hand. The cylinder 20 and the bearing cap 22 are so shaped that there is a smooth continuity of the outer surface where they join.

An annular chamber 26 is defined within the cylinder 20 and exteriorly of the handle 16. Said chamber 26 is closed off at its lower end by bearing cap 22. A coil compression spring 28 is positioned in this annular chamber 26 with its lower end seated in an annular groove 46 in the interior end of bearing cap 22. Said groove is positioned to keep the lower end of the spring 28 spaced slightly from handle 16, thereby minimizing friction between moving parts.

Between its upper end and the grip 24, cylinder 20 is provided with a flat surface 30 along the exterior thereof. A lengthwise slot 32 is extended through the cylinder wall parallel with the cylinder axis, the slot being disposed about mid-way of the width of said flat surface 30. Weight calibrations 34 are marked in said flat surface along the length of said slot 32.

At the upper end of the spring 28 is an annular sleeve 36, the outer diameter of which is just slightly less than the inner diameter of cylinder 20, and the inner diameter of which is just slightly larger than that of handle 16, so that the sleeve is slideable along the handle and within the cylinder. The interior edge 48 of said sleeve 36 serves as a stop for the upper end of coil spring 28. Said edge is radially inwardly beveled to define, together with the outer periphery of handle 16, an annular seat in which the upper end of the spring seats. Said spring end is spaced slightly from the wall of cylinder 20, thereby minimizing friction between moving parts.

The annular sleeve 36 and handle 16 are provided with a pair of diametrally opposed holes to receive a transverse pin 42, the length of which is somewhat greater than the inside diameter of cylinder 20. The pin fits tightly in one or both of the holes in the sleeve, so that it will be held in place, while being capable of being forced out for disassembly. When the pin 42 is in position in sleeve 36, it protrudes therefrom and protrudes or extends into slot 32. The pin also serves to prevent the cylinder from rotating in respect to handle 16 of the net.

The inner surface of cylinder 20 at its upper end is threaded to receive a threaded end plug 38 having a knurled exterior end 40 by which the end plug can be turned into and out of the end of cylinder 20. Said end plug is axially drilled through to a diameter just slightly larger than that of handle 16 so that said handle is slideable therethrough.

It will be seen that upon turning the end plug into cylinder 20, it will bear against and force the annular sleeve 36 axially toward the lower end of the cylinder, thereby compressing coil spring 28. The reverse occurs (until the spring reaches its unloaded length) as the plug is turned in a direction out of the cylinder.

As the sleeve 36 moves, in response to turning of the end plug 38, the pin 42 moves therewith in relation. The calibrations on cylinder 20 are correlated and spaced with respect to the compressive characteristics of the particular coil spring used so that weight displacement of the spring matches the calibrations.

When a load is applied on handle 16 in a direction along its length and toward the net end, while the cylinder is held stationary, the handle slides in response to the load, carrying with it sleeve 36 (by forces transmitted through pin 42) which bears against and compresses spring 28, until the resistive force exerted by the compressed spring equals that of the force of the load—at which point movement of the handle ceases. Thereby the scale unit can be adjusted and "zeroed."

In use, when a fish has been netted, the fish is automatically weighed by grasping the cylinder 20 at grip 24 and turning the net handle vertically with the net end down. (Thereby the net sides cover the opening to "close" the net to keep the fish from escaping.) The weight is read by the point on the weight calibration scale 34 opposite the position of pin 42 in slot 32.

It will be seen that the weigh scale unit comprising cylinder 20, bearing cap 22, coil spring 28, sleeve 36, adjusting plug 38, and pin 42, form a self-contained unit 18, which can be removed from the handle of a fish net simply by removing pin 42 from sleeve 36 and sliding the scale unit off the end of the handle. It is as simply attached to the handle. To facilitate insertion and removal of the pin 42, a port 44 (FIG. 3) is advantageously drilled into the cylinder toward the upper end thereof and opposite slot 32. The pin can be removed by sliding the scale and/or by turning the adjusting end plug 38 until the pin is positioned opposite said port 44. Then a tool, such as a punch or nail, is inserted into said port to drive the pin from the sleeve on the slot side of the cylinder.

It will also be seen that my scale unit can be fastened to any elongate handle or bar having a diameter approximately that of the hole diameters in end cap 22 and end plug 38, simply by drilling a single diametral hole through the handle toward the middle thereof. It should be mentioned, however, that it is not necessary to position the weigh scale at the middle of the handle. It can as well be positioned at the end of the handle opposite the net 10. In this instance the knurled end plug 38 will preferably not be drilled through, but will be somewhat differently designed so as to form an end cap for the device. For example, it could be a solid plug which is centrally tapped to provide an adjusting screw which contacts sleeve 36, by which the scale adjustment is made (rather than by turning the entire end plug).

Referring now to FIGURE 4, wherein a modified embodiment of my invention is shown, it will be seen that the scale unit still comprises a cylinder 50 having a lower bearing cap 52 and upper plug 54 between which is interposed a coil spring 56. However, in this instance the weight calibrations 57 are placed upon the handle 16 of the net toward the lower end of the cylinder 50.

A pin 58 having a length just slightly less than the inside diameter of the cylinder, extends through the handle 16. In this embodiment the pin which is interposed between the upper end of the coil spring 56 and the inside end of upper plug 54, serves as the upper spring stop. Ports 60 and 60' positioned diametrally in the cylinder 50 permit insertion and removal of the pin 58. Weighing occurs as before, but the weight is read as the point at which the lower end of cylinder 50 is positioned on the calibrated scale on the handle. If it is desirable, suitable means can be provided, e.g., by making the end plug 54 adjustable as in the device of FIGURES 1-3, for altering the position of the cylinder axially in respect to the calibrations on the handle thereby to permit a "zeroing" of the scale device.

If desired, an axially disposed groove can be provided in the inner wall of cylinder 50, and the pin 58 lengthened sufficiently to extend within said slot whereby the cylinder will not be permitted to rotate with respect to the handle.

Herein I have described my invention with the aid of specific but non-limiting illustrations. Numerous variations will suggest themselves. For example, it is unnecessary to employ a compression spring, as my scale unit or device can employ a tension spring by appropriately anchoring the spring at the spring stops. Also, the tubular handle of the net can be filled with some buoyant material, such as cellular material commonly used in life preservers, to render the entire device floatable. I do not intend to be limited to the specific illustrations, the illustration shown, but instead intend only to be limited by this specification taken as a whole, including the appended claims.

I claim:

1. A weigh scale comprising an elongate bar for holding a load to be weighed, a cylinder axially movably journalled on said bar with said bar extending completely through said cylinder, an annular chamber being defined within said cylinder about said bar, a cylindrical coil spring positioned in said chamber about said bar, a first spring stop fixed to said cylinder at one end of said spring, a second spring stop affixed to said bar at the other end of said spring, said second stop being axially movable with respect to said cylinder, means on said cylinder for adjustably limiting the movement of said second stop in response to normal urging of said spring.

2. For use in combination with an elongate bar for weighing objects held on said bar, a cylinder, a resilient coil spring positioned concentrically within said cylinder closely adjacent the wall thereof, a first spring stop fixed to said cylinder at one end of said spring, an axial central space defined within said cylinder and spring for slideably receiving the elongate bar, said axial space extending throughout the entire length of said cylinder; a second stop at the other end of said spring adapted to be removably affixed to said bar, said second stop being movable axially with respect to said cylinder, means on said cylinder for adjustably limiting the movement of said second stop in response to normal urging of said spring without constricting said axial space.

3. A scale and fish landing net comprising a net having an elongate handle, a cylinder axially journalled on said handle with said handle extending completely through said cylinder, an annular chamber being defined within said cylinder exteriorly of said handle, said annular chamber being closed at one end of said cylinder by a bearing cap fixed to said cylinder and fitting closely about said handle while allowing free axial movement of said handle, a coil compression spring positioned in said chamber about said handle and bearing at one end against said bearing cap, a slot in said cylinder extending parallel to the axis thereof, weight calibrations on the exterior of said cylinder along said slot, a sleeve fixedly journalled about said handle at the other end of said spring within said chamber, said sleeve being axially movable with respect to said cylinder, a protrusion on said sleeve extending into said slot and moving along said slot as said sleeve moves with respect to said cylinder, a threaded annular plug at the end of said cylinder opposite said bearing cap, the inner end of said plug contacting said sleeve and adjustably limiting the distance said sleeve can move away from said bearing cap in response to forces applied by said compression spring and permitting zeroing of said projection with respect to said weight calibrations, said projection serving further to prevent rotation of said cylinder with respect to said handle.

4. A scale and fish landing net comprising a net having an elongate handle, a cylinder axially journalled on said handle with said handle extending completely through said cylinder, an annular chamber being defined within said cylinder exteriorly of said handle, said annular chamber being closed at one end of said cylinder by a bearing cap fixed to said cylinder and fitting closely about said handle while allowing free axial movement of said handle, a coil compression spring positioned in said chamber about said handle and bearing at one end against said bearing cap, a transverse pin disposed slidably in said chamber extending through said handle and protruding therefrom, the other end of said coil spring bearing against said pin, said pin further being readily removable from said handle through an access-way provided in said cylinder, weight calibrations visible on one of said cylinder and said handle adjacent a fixed point of reference on the other of said handle and said cylinder.

5. For use in combination with an elongate bar for weighing objects held on said bar, a cylinder, an annular bearing cap fixed to said cylinder adapted to fit closely about a bar inserted therewithin, the inner diameter of said bearing cap being less than the inner diameter of said cylinder to define an annular chamber within said cylinder, a coil compression spring positioned in said chamber and bearing at one end against said bearing cap, a slot in said cylinder extending generally lengthwise thereof, weight calibrations on the exterior of said cylinder along said slot, an annular sleeve positioned in said chamber against which bears the other end of said spring, said sleeve being axially movable with respect to said cylinder, removable pin means associated with said sleeve for fastening said sleeve to said bar, said pin means protruding into said slot and moving therealong with said sleeve as the latter moves with respect to said cylinder, a threaded end plug at the end of said cylinder opposite said bearing cap, the inner end of said plug contacting said sleeve and adjustably limiting the distance said sleeve can move away from said bearing cap in response to forces applied by said compression spring and permitting zeroing of the protrusion of said pin means with respect to said weight calibrations, said protrusion serving further to limit rotation of said cylinder with respect to said sleeve.

References Cited by the Examiner

UNITED STATES PATENTS

| | | | |
|---|---|---|---|
| 601,737 | 4/1898 | Smith | 177—245 X |
| 2,586,245 | 2/1952 | McRae | 177—131 |
| 2,630,314 | 3/1953 | Cadwallader | 177—129 |

FOREIGN PATENTS

| | | |
|---|---|---|
| 11,111 | 5/1911 | Great Britain. |

LEO SMILOW, *Primary Examiner.*